United States Patent [19]
Yamada et al.

[11] Patent Number: 5,281,453
[45] Date of Patent: Jan. 25, 1994

[54] MULTILAYER COMPOSITES AND EASILY OPENABLE CONTAINERS

[75] Inventors: Toyokazu Yamada; Masahiro Akamatsu, both of Himeji, Japan

[73] Assignee: Idemitsu Petrochemical Co., Ltd., Tokyo, Japan

[21] Appl. No.: 639,334

[22] Filed: Jan. 10, 1991

[30] Foreign Application Priority Data

Jan. 16, 1990 [JP] Japan .................................... 2-4518
Oct. 8, 1990 [JP] Japan .................................... 2-268347

[51] Int. Cl.$^5$ .......................................... B65D 17/40
[52] U.S. Cl. ................................. 428/35.7; 428/35.9;
428/36.5; 428/36.7; 428/40; 428/43; 428/516;
428/519; 220/359; 220/276
[58] Field of Search ..................... 220/453, 354, 359;
428/35.7, 36.7, 518, 517, 519, 521, 36.5, 35.9,
516, 40, 43, 365

[56] References Cited

U.S. PATENT DOCUMENTS

| | | | |
|---|---|---|---|
| 4,008,347 | 2/1977 | Amberg et al. | 428/36.5 |
| 4,101,050 | 6/1978 | Buckler | 428/517 |
| 4,111,349 | 9/1978 | Buckley et al. | 428/517 |
| 4,292,355 | 9/1981 | Bouis | 428/517 |
| 4,332,858 | 6/1982 | Saitoh et al. | 428/517 |
| 4,440,824 | 4/1984 | Bonis | 428/517 |
| 4,605,142 | 8/1986 | Itoh | 220/359 |
| 4,938,683 | 7/1990 | Boice | 428/517 |
| 4,970,113 | 11/1990 | Yamada | 428/516 |
| 5,061,532 | 10/1991 | Yamada | 428/35.7 |
| 5,084,352 | 1/1992 | Percec | 428/517 |
| 5,673,601 | 6/1987 | Lamping | 428/517 |

FOREIGN PATENT DOCUMENTS

0338488 10/1989 European Pat. Off. .
2343870 3/1975 Fed. Rep. of Germany .
2276171 1/1976 France .
2494184 5/1982 France .

Primary Examiner—Henry F. Epstein
Assistant Examiner—Rena Dye
Attorney, Agent, or Firm—Antonelli, Terry, Stout & Kraus

[57] ABSTRACT

A multilayer composite and an easily openable container produced by using the multilayer composite are provided. The multilayer composite comprises a surface layer of a polyolefin resin, an intermediate layer of a mixture of a polystyrenic resin with a thermoplastic elastomer or with a thermoplastic elastomer and a polyolefin resin, and a base layer of a polystyrenic resin, and the peeling strength between the intermediate layer and the base layer is larger than the peeling strength between the surface layer and the intermediate layer. The easily openable container produced by using the multilayer composite is capable of being sealed with a lid strongly while maintaining easy openability because the opening of the sealed container is performed utilizing the peeling between the surface layer and the intermediate layer.

46 Claims, 2 Drawing Sheets

MULTILAYER COMPOSITES AND EASILY OPENABLE CONTAINERS

BACKGROUND OF THE INVENTION (a) Field of the Invention

The present invention relates to a multilayer composite being suitable for the production of packaging materials, particularly containers, and to an easily openable container produced by using the multilayer composite, which excels both in hermetic sealability and in openability and, therefore, is suitable particularly for packaging foods, medicines, and cosmetics.

(b) Description of the Related Art

Polystyrene hermetically sealed containers have mainly been used for packaging dessert foods or dairy products.

Polystyrene hermetically sealed containers, however, have a problem that the hermetic sealability thereof cannot be improved without decreasing openability. In order to solve the problem, aluminum foil or plastics film coated with hot melt adhesives or lacquer adhesives has generally been used as a lid member to improve openability. Nonetheless, such a kind of hermetically sealed containers are still insufficient in openability, and most of those are difficult for infants and young boys and girls to open. There are further problems including a poor oil resistance and an increase in cost. In particular, hermetically sealed containers for packaging bean curd, which are produced by heat sealing polystyrene containers with lids of CPP film, are so difficult to open that housewives are obliged to cut the lids of CPP film by using a kitchen knife to take out the bean curd.

Since all these containers have a defect in openability, and using lids with specified sealant to improve openability also results in a problem of increasing the cost, the development of containers having both good hermetic sealability and easy openability has been hoped for.

SUMMARY OF THE INVENTION

An object of the present invention is to provide a multilayer composite which is suitable for producing an easily openable container which, after heat sealed with a lid, is to be opened by using the delamination thereof in an interface which is different from the interface between the container and the lid.

Another object of the present invention is to provide an easily openable container which has a base layer of a polystyrenic resin by using the multilayer composite above mentioned, and it is excellent in heat sealing with a lid, hermetic sealability and easy openability.

The inventors studied to attain the objects of the present invention and found that the objects can be accomplished by producing a container by using a multilayer composite having a specific multilayer structure, and the finding led the inventors to complete the present invention.

That is, the present invention provides a multilayer composite which has a multilayer structure comprising (A) a surface layer of a polyolefin resin;

(B) an intermediate layer of a mixture of a polystyrenic resin and a polymer which is an ingredient other than the polystyrenic resin, the polymer ingredient consisting essentially of (a) 5 to 40% by weight of a thermoplastic elastomer consisting essentially of a styrene-isoprene copolymer, based on the total of the polystyrenic resin and the polymer ingredient in the intermediate layer or (b) (i) 0 to 15% by weight of a thermoplastic elastomer consisting essentially of a styrene-butadiene copolymer and (ii) 0 to 25% by weight of a polyolefin resin, the total of the thermoplastic elastomer and the polyolefin resin being 3 to 25% by weight, all based on the total of the polystyrenic resin and the polymer ingredient in the intermediate layer; and (C) a base layer of a polystyrenic resin, the base layer and the surface layer sandwiching the intermediate layer between them; wherein the peeling strength between the base layer and the intermediate layer is larger than the peeling strength between the surface layer and the intermediate layer.

The present invention further provides a multilayer sheet which has the same multilayer structure as that of the multilayer composite and is suitable for the production of easily openable containers.

The present invention further provides an easily openable container which comprises (I) the same multilayer structure as that of the multilayer composite;
(II) a bottom wall;
(III) a side wall upstanding from the bottom wall; and
(IV) a fringe surrounding the open end of the side wall and extending outwardly therefrom, the fringe having on its upper surface a circular sealing area extending circularly thereon, the sealing area being for sealing the easily openable container with a lid by securing the lid circularly to the easily openable container at the sealing area.

DESCRIPTION OF THE PREFERRED EMBODIMENTS

Hereinafter, the multilayer composite of the present invention will be described referring to FIG. 1.

Figure 1:
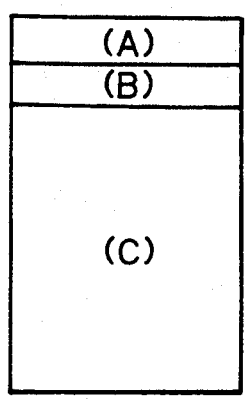
FIG. 1 is a schematic view illustrating a multilayer composite of an embodiment according to the present invention.

FIG. 1 is a schematic view illustrating a multilayer composite of an embodiment according to the present invention.

The multilayer composite of FIG. 1 consists of a surface layer (A), an intermediate layer (B), and a base layer (C).

The surface layer (A) is to be an easily peelable layer after the multilayer composite is formed into a container, and is made of a polyolefin resin. The preferred examples of the polyolefin resin to be used include a polyethylene, for example, ethylene homopolymer such as high density polyethylene (HDPE), linear low density polyethylene (LLDPE), or low density polyethylene (LDPE), an ethylene copolymer, such as ethylene-vinyl acetate copolymer (EVA), ethylene-α-olefin copolymers including ethylene-propylene copolymer, or ethylene-β-olefin copolymers; a polypropylene, for example, propylene homopolymer or propylene copolymers, such as propylene-olefin block or random copolymers; and mixtures thereof. According to demand, color pigments including white pigments, such as titanium oxide, may be added to the polyolefin resin. Further, polystyrene also may be added to the polyolefin resin. The preferable amount of the polystyrene added is at most 15% by weight, based on the total of the polystyrene and the polyolefin resin. Adding more than 15% by weight of polystyrene may sometimes make the polystyrene not miscible with the polyolefin resin, resulting in a deterioration in the appearance of the multilayer composite, or may sometimes increase excessively the peeling strength between the surface layer (A) and the intermediate layer (B), thereby making the surface layer (A) and the intermediate layer (B) not easy to peel from each other.

The intermediate layer (B) is a layer for regulating peeling strength properly and is of a mixture of a polystyrenic resin and a polymer ingredient, the polymer ingredient consisting essentially of (a) 5 to 40% by weight of a thermoplastic elastomer consisting essentially of a styrene-isoprene copolymer, based on the total of the polystyrenic resin and the polymer ingredient in the intermediate layer or (b) (i) 0 to 15% by weight of a thermoplastic elastomer consisting essentially of a styrene-butadiene copolymer and (ii) 0 to 25% by weight of a polyolefin resin, the total of the thermoplastic elastomer and the polyolefin resin being 3 to 25% by weight, all based on the total of the polystyrenic resin and the polymer ingredient in the intermediate layer.

In case the thermoplastic elastomer consisting essentially of a styrene-isoprene copolymer is used as the polymer ingredient in the intermediate layer, if the amount of the thermoplastic elastomer used is less than 5% by weight, the small peeling strength between the surface layer (A) and the intermediate layer (B) produces insufficiency of sealability of containers. If the amount is more than 40% by weight, the peeling strength between the surface layer (A) and the intermediate layer (B) will increase excessively, and that gives a loss of easy peelability.

In case the polymer ingredient consists essentially of (i) 0 to 15% by weight of a thermoplastic elastomer consisting essentially of a styrene-butadiene copolymer and (ii) 0 to 25% by weight of a polyolefin resin, all based on the total of the polystyrenic resin and the polymer ingredient in the intermediate layer (B), and the content of the polyolefin resin (ii) is 0% by weight, the intermediate layer (B) contains the thermoplastic elastomer consisting essentially of the styrene-butadiene copolymer in an amount of 3 to 15% by weight. On the other hand, in case the content of the thermoplastic elastomer consisting essentially of a styrene-butadiene copolymer is 0% by weight, the intermediate layer (B) contains the polyolefin resin in an amount of 3 to 25% by weight.

If the total of the thermoplastic elastomer consisting essentially of a styrene-butadiene copolymer and the polyolefin resin is more than 25% by weight, the peeling strength between the surface layer (A) and the intermediate layer (B) will be too strong. For instance, in case the content of the thermoplastic elastomer consisting essentially of a styrene-butadiene copolymer in the intermediate layer (B) is 4% by weight, easy peelability between the surface layer (A) and the intermediate layer (B) is ensured by adjusting the content of the polyolefin resin not more than 21% by weight. If the content of the polyolefin resin is more than 21% by weight in this case, the peeling strength between the surface layer (A) and the intermediate layer (B) will become too strong.

If the total of the thermoplastic elastomer consisting essentially of a styrene-butadiene copolymer and the polyolefin resin is less than 3% by weight, the peeling strength between the surface layer (A) and the intermediate layer (B) will be too small to render sufficient sealability to containers.

Further, either more than 15% by weight of the thermoplastic elastomer consisting essentially of a styrene-butadiene copolymer or more than 25% by weight of the polyolefin resin makes the peeling strength between the surface layer (A) and the intermediate layer (B) too strong.

The polymer ingredient described above may contain other resins so far as the accomplishment of the object of the present invention is not hindered.

The preferred examples of the polystyrenic resin to be used in the intermediate layer include general purpose polystyrene, high impact polystyrene, acid modified polystyrene, syndiotactic polystyrene, mixtures thereof, and mixtures of these and styrenic elastomers.

The preferred examples of the thermoplastic elastomer consisting essentially of a styrene-butadiene copolymer to be used in the intermediate layer (B) include styrene-butadiene-styrene block copolymer (SBS) and styrene-butadiene block copolymer (SB).

The preferred examples of the polyolefin resin to be used in the intermediate layer (B) include a polyethylene, for example, ethylene homopolymer such as high density polyethylene (HDPE), linear low density polyethylene (LLDPE), or low density polyethylene (LDPE), an ethylene copolymer, such as ethylene-vinyl acetate copolymer (EVA), ethylene-α-olefin copolymers including ethylene-propylene copolymer, or ethylene-β-olefin copolymers; a polypropylene, for example, propylene homopolymer or propylene copolymers, such as propylene-olefin block or random copolymers; and mixtures thereof.

The base layer (C) is formed of a polystyrenic resin. The preferred examples of the polystyrenic resin to be used in the base layer (C) include general purpose polystyrene, high impact polystyrene, acid modified polystyrene, syndiotactic polystyrene, mixtures thereof, and mixtures of these with styrenic elastomers. Using the polystyrenic resin in the base layer (C) makes the stiffness of containers high. Further, within the range wherein an enough peeling strength between the base layer (C) and the intermediate layer (B) is ensured, scrap from producing the multilayer composite of the present invention or scrap from producing containers may be added in the base layer (C), thereby reducing the cost.

In the multilayer composite of the present invention, which comprises three layers including the surface layer (A), the intermediate layer (B), and the base layer (C) described above, it is necessary that the peeling strength between the intermediate layer (B) and the base layer (C) be larger than the peeling strength between the surface layer (A) and the intermediate layer (B). It is preferable that the peeling strength between the surface layer (A) and the intermediate layer (B) is 0.2 to 2.0 kg/15 mm, as measured at a peeling speed of 300 mm/min, and the peeling strength between the intermediate layer (B) and the base layer (C) is at least 1.1 times as much as the peeling strength between the surface layer (A) and the intermediate layer (B). Adjusting the peeling strength between the surface layer (A) and the intermediate layer (B) and the peeling strength between the intermediate layer (B) and the base layer (C) to the ranges above mentioned makes the surface layer (A) and the intermediate layer (B) easy to peel between them, and the intermediate layer (B) and the base layer (C) difficult to peel between them. Thus, both good sealability and easy openability are ensured to containers produced by using the multilayer composite. The more preferable peeling strength between the surface layer (A) and the intermediate layer (B) is 0.2 to 1.5 kg/15 mm.

The controlling of each peeling strength can be easily performed by properly selecting resin materials and the mixing ratios thereof from those above described.

The thickness of the surface layer is not particularly limited so far as it enables the surface layer to be peeled from the intermediate layer, and generally is 2 to 400 μm, preferably 5 to 200 μm. The preferred thickness of the intermediate layer be at most 30%, more preferably, at most 20% of the whole thickness of the multilayer composite in consideration of the processability during film forming, and is generally 5 to 300 μm. The thickness of the base layer is not particularly limited, and is generally 10 to 3,000 μm. The ratios between the thicknesses of these layers are not particularly limited, but it is preferable that the thickness of the intermediate layer is smaller than that of the base layer in consideration of heat resistance.

Although the multilayer composite of FIG. 1 consists of three layers of a surface layer, an intermediate layer, and a base layer, the present invention is not to be limited to this embodiment. On the other surface of the base layer than the surface being in contact with the intermediate layer, one or more additional layers of other materials may be provided on the purpose of improving oxygen gas barrier property or of preventing the deformation of containers. Some examples of the additional layers of other materials include a resin layer of ethylene-vinyl alcohol copolymer (EVOH), a polyvinylidene chloride (PVDC), nylon, or polyethylene terephthalate, and a layer of an excellent gas barrier property, such as aluminum evaporation layer, aluminum foil, aluminum sheet, iron sheet or copper sheet. The preferred ethylene-vinyl alcohol copolymer (EVOH) has an ethylene unit content of 25 to 60 mol %. The preferred polyvinylidene chloride (PVDC) is vinylidene chloride-vinyl chloride copolymer or vinylidene chloride-methacrylic acid copolymer. Each additional layer may consists of only one layer, or may be a laminate consisting of two or more layers, or may be a resin layer containing 10 to 80% by weight of an inorganic filler. Further, the additional layer may be a composite material, for example, a composite material consisting of metal and paper. It is advantageous to provide adhesive layers between these layers, according to demand.

The shape of the multilayer composite of the present invention is not limited, and generally, a form of multilayer sheet is suitable for producing easily openable containers.

A multilayer sheet of the present invention comprises the same surface layer, intermediate layer and base layer as those of the multilayer composite of the present invention, and the peeling strength between the base layer and the intermediate layer is larger than the peeling strength between the surface layer and the intermediate layer. For instance, the multilayer sheet is obtainable by coextrusion molding using resin materials above described or by laminating films of the resin materials. For example, the coextrusion molding is performed by melt extruding the resin materials for surface layer, intermediate layer, and base layer from different extruders, followed by laminating them in a feed block, and then feeding the laminated matter into a flat die to shape it into film. Alternatively, after the melt extrusion of the resin materials using different extruders, the extruded resin materials are passed through dies separately, and then fed into a multi-layering die where they are laminated and shaped into a multilayer sheet. Some examples of the laminating method are hot melt laminating, dry laminating, and wet laminating. It is generally desirable to employ a coextrusion laminating method in which a two-layer composite consisting of a surface layer and an intermediate layer is produced by coextrusion and then, a base layer is laminated on the intermediate layer.

The present invention further provides an easily openable container which comprises
(I) a multilayer structure which is the same as that of the multilayer composite comprising a surface layer, an intermediate layer, and a base layer;
(II) a bottom wall;
(III) a side wall upstanding from the bottom wall; and
(IV) a fringe surrounding the open end of the side wall and extending outwardly therefrom, the fringe having on its upper surface a circular sealing area extending circularly thereon, the sealing area being for sealing the easily openable container with a lid by securing the lid circularly to the easily openable container at the sealing area.

The easily openable container, generally, is produced by heating the multilayer composite described above and forming it into a desired shape, and, for example, vacuum molding or pressure forming is suitable for the production. Also, the easily openable container is obtainable by injection molding, injection-blow molding or blow molding using the resin materials above described.

The shape of the fringe of the easily openable container is not particularly limited, and it is generally a circle one or a square one. On the fringe, the easily openable container is to be circularly sealed with a lid. The easily openable container may have either a cup shape or a tray shape.

The easily openable container of the present invention is sealed with a lid on the fringe to produce a hermetically sealed container.

The lid to be used for sealing the easily openable container has a sealant layer of a resin which is identical with or similar to that of the surface layer of the easily openable container so that the sealant layer adheres strongly to the surface layer by heating. In particular, when the surface layer is polyethylene, it is generally preferable to use a lid having a sealant layer made mainly of the same polyethylene. However, linear low density polyethylene adheres easily even to a polyethylene of a different kind, and therefore may be used as a sealant layer both for a surface layer of the same polyethylene and for that of a different polyethylene. When the surface layer is a polypropylene, the sealant layer of the lid may be the same polypropylene, but it is preferable to use a polypropylene random copolymer as the sealant layer because it is applicable in a wide range of sealing conditions. The lid may have one or more additional layers, such as a layer of aluminum foil or heat resistant film, on the sealant layer.

Figure 2:
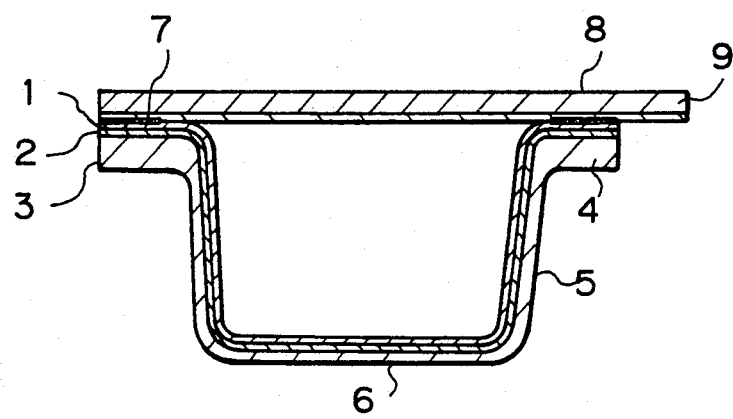
FIG. 2 is a sectional view of an easily openable container of an embodiment according to the present invention, wherein the easily openable container is sealed with a lid.

FIG. 2 is a sectional view of an easily openable container of an embodiment according to the present invention, wherein the easily openable container is sealed with a lid.

In FIG. 2, a referential numeral 1 represents a surface layer, a referential numeral 2 represents an intermediate layer, and a referential numeral 3 represents a base layer. The multilayer structure composed of the surface layer 1, the intermediate layer 2, and the base layer 3 is the same as that of the multilayer composite of the present invention comprising the surface layer (A), the intermediate layer (B) and the base layer (C), and the three layers 1, 2, and 3 form a fringe 4. A referential numeral 5 represents a side wall, and a referential numeral 6 represents a bottom wall. A referential numeral 8 is a lid which is circularly heat sealed to the surface layer 1 in a circular sealing area 7 on the surface of the fringe 4. A referential numeral 9 represents a picking portion for facilitating peeling the lid 8 off.

In order to open the easily openable container of FIG. 2 sealed with the lid 8, at first, the tab portion 9 is lifted up. Then, delamination of the easily openable container occurs between the surface layer 1 and the intermediate layer 2, and the delamination proceeds to the inner edge of the sealing area 7, thereby making the surface layer 1 be peeled together with the lid 8. Subsequently, the surface layer 1 breaks off at the inner edge of the sealing area 7, resulting in the opening of the easily openable container. Therefore, the easily openable container can be opened easily even if the lid 8 and the surface layer 1 is heat sealed so strongly as to prevent peeling between them.

In case the surface layer of the easily openable container has a thickness of more than 10 μm, it is preferable to provide a circular weakening line in the surface layer of the fringe between the open end of the side wall and the inner edge of the circular sealing area in order to ensure easy openability. The weakening line provided in the surface layer, generally, is a circular notch. The notch may have a depth not greater than the thickness of the surface layer, or may have a depth larger than the thickness of the surface layer and extend into the intermediate layer or further into a part of the base layer. In the latter case, the surface layer is peeled off more easily together with the lid, thereby improving easy openability.

Figure 3:
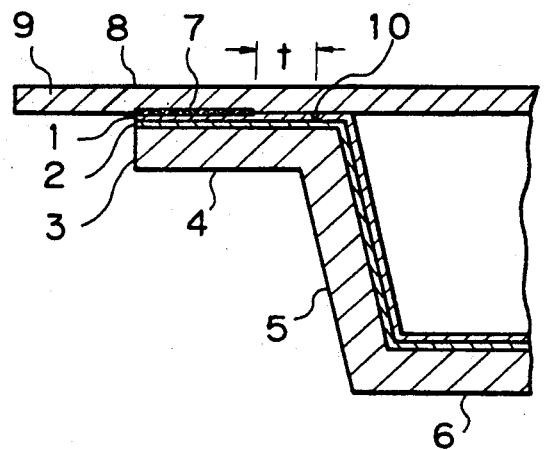
FIG. 3 is a partially sectional view of an easily openable container of another embodiment according to the present invention, wherein the easily openable container is sealed with a lid.

FIG. 3 is a partially sectional view of an easily openable container of another embodiment according to the present invention, wherein the easily openable container is sealed with a lid.

A referential numeral 1 represents a surface layer, a referential numeral 2 represents an intermediate layer, and a referential numeral 3 represents a base layer. The multilayer structure composed of the surface layer 1, the intermediate layer 2, and the base layer 3 is the same as that of the multilayer composite of the present invention comprising the surface layer (A), the intermediate layer (B) and the base layer (C), and the three layers 1, 2, and 3 shape a fringe 4. A referential numeral 5 represents a side wall, and a referential numeral 6 represents a bottom wall. A referential numeral 8 is a lid which is circularly heat sealed to the surface layer 1 in a circular sealing area 7 on the surface of the fringe 4. A referential numeral 9 represents a tab portion for facilitating peeling the lid 8 off. As a weakening line 10, a circular notch is provided in the surface layer 1 of the fringe 4 between the open end of the side wall 5 and the inner edge of the circular sealing area 7. The weakening line 10 is a means for cutting the surface layer 1 circularly between the open end of the side wall 5 and the inner edge of the sealing area 7 when the surface layer 1 is peeled with the lid 8 to open the easily openable container. The weakening line 10 is generally provided in a form of a circular notch as shown in FIG. 3, but it may have any other form with the proviso that it makes the surface layer 1 easy to cut at the time of peeling off the lid 8. The space between the inner edge of the circular sealing area 7 and the weakening line 10 is preferably at most 10 mm, particularly preferably from 0.2 mm to 10 mm.

In order to open the easily openable container of FIG. 3 sealed with the lid 8, at first, the tab portion 9 is lifted up. Then, delamination of the easily openable container occurs between the surface layer 1 and the intermediate layer 2, and the delamination proceeds to the weakening line 10 (notch), thereby making the surface layer 1 be peeled together with the lid 8. Subsequently, the surface layer 1 breaks off at the weakening line 10, resulting in the opening of the easily openable container. Therefore, the easily openable container can be opened easily even if the lid 8 and the surface layer 1 is heat sealed so strongly as to prevent peeling between them.

Alternatively, the surface layer's break may be facilitated by, instead of providing the weakening line, reducing the thickness of the surface layer at the edge between the fringe and the side wall, thereby inducing the surface layer to break at the edge at the time of opening. In the easily openable container of this embodiment, the surface layer has a thickness of S μm in the sealing area in the fringe, has a thickness of T μm at the edge between the fringe and the side wall, and is made of a material having a tensile breaking strength of U kg/cm$^2$, and the numerical values of S, T, and U are so related to each other through the following inequalities or equations $$S \geq 1.1 \times T$$

$$T \leq (1.33/U) \times 10^4,$$

and the tensile load per unit width required to break the surface layer at the edge between the fringe and the side wall is smaller than the load per unit width required to peel the surface layer from the intermediate layer at the edge between the fringe and the side wall.

Figure 4:
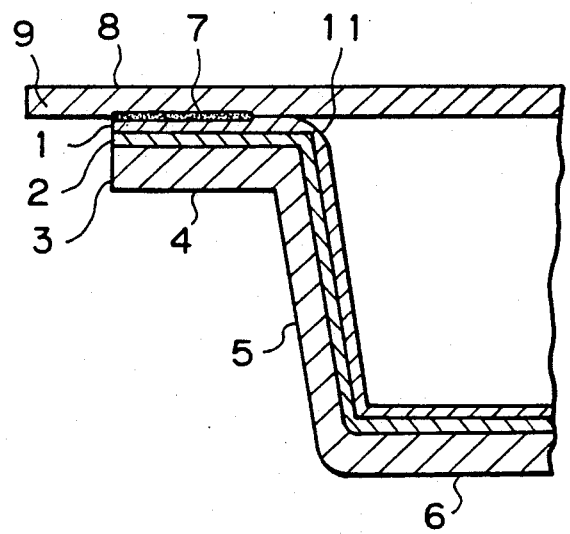
FIG. 4 is a partially sectional view of an easily openable container of further another embodiment according to the present invention, wherein the easily openable container is sealed with a lid.

FIG. 4 is a partially sectional view of an easily openable container of further another embodiment according to the present invention, wherein the easily openable container is sealed with a lid.

In the easily openable container of FIG. 4, the surface layer 1 is thinned at the edge 11 between the side wall 5 and the fringe 4 instead of being provided with the weakening line 10 shown in FIG. 3. The surface layer 1 has the smallest thickness of T μm at the edge 11 and has a thickness of S μm in the sealing area 7 of the fringe 4 where the easily openable container is sealed with the lid 8. When the lid 8 is peeled off to open the sealed container, the surface layer 1 is broken at the edge 11 and is peeled off together with the lid 8.

If the fringe comprises a lower fringe portion directly extending outwardly from the open end of the side wall and an upper fringe portion having a sealing area, which are connected to each other through a joining portion upstanding from the outer end of the lower fringe portion, the surface layer is thinned to T' μm at the edge between the side wall and the lower fringe portion. If a straight rim or a curled rim is provided to the outer end of the fringe, it is preferable that the surface layer is thinned to T" μm also at the edge between the fringe and the straight rim or the curled rim so that the surface layer can be easily broken also at the edge, thereby further ensuring easy openability in spite of the presence of the straight rim or the curled rim.

It is necessary that the thicknesses S and T (μm) of the surface layer and the tensile breaking strength U (kg/cm²) of the surface layer are so related to each other through the inequalities or equations above mentioned. So with the relationship between S, T', and U and with the relationship between S, T", and U. If the thickness S is too small, the sealing strength between the surface layer and the sealant layer of a lid will be insufficient for a hermetically sealed container's need. If the thicknesses T, T', and T" are too large, the surface layer cannot be broken, making opening of the container impossible.

The multilayer composite of the present invention may be used not only for the production of a container but also for the production of a package of a bag type or as a lid material to be used for the production of an easily openable sealed container which is opened by using the delamination of the lid member thereof.

The present invention will be described in more detail with reference to the following Examples. These Examples, however, are not to be construed to limit the scope of the invention.

EXAMPLES 1 TO 32 AND COMPARATIVE EXAMPLES 1 TO 16

EXAMPLES 1 TO 30 AND COMPARATIVE EXAMPLES 1 TO 16

In Table 1 shown are the resin materials used in Examples 1 to 30 for producing multilayer composites of the present invention, the peeling strengths between the layers thereof, and the evaluation results of the easy openability of containers which were produced by using the multilayer composites and heat sealed with lids. In Table 2 shown are the resin materials used in Comparative Examples 1 to 16 for producing multilayer composites, the peeling strengths between the layers thereof, and the evaluation results of the easy openability of containers which were produced by using the multilayer composites and heat sealed with lids.

Abbreviated characters in Tables 1 and 2 have the following meanings.

$PE_1$: high density polyethylene (produced by Idemitsu Petrochemical Co., Ltd., Trademark: IDEMITSU POLYETHYLENE 110J, MI (melt index): 13 g/10 min)

$PE_2$: high density polyethylene (produced by Idemitsu Petrochemical Co., Ltd., Trademark: IDEMITSU POLYETHYLENE 210J, MI: 5.8 g/10 min)

$PE_3$: high density polyethylene (produced by Idemitsu Petrochemical Co., Ltd., Trademark: IDEMITSU POLYETHYLENE 440M, MI: 0.9 g/10 min)

$PE_4$: low density polyethylene (produced by Tosoh Co., Ltd. Trademark: PETROTHEN 205, MI: 3 g/10 min)

$PE_5$: ethylene-α-olefin copolymer (produced by Mitsui Petrochemical Industries, Ltd., Trademark: TAFMER A-4085, MI: 3.6 g/10 min at 190° C.)

$PP_1$: propylene-olefin copolymer (produced by Mitsui Petrochemical Industries, Ltd., Trademark: TAFMER XR-1071, MI: 3.6 g/10 min at 190° C.)

EVA: ethylene-vinyl acetate copolymer (produced by Tosoh Co., Ltd., Trademark: ULTRATHEN UE540F, MI: 3 g/10 min)

$PP_2$: polypropylene (produced by Idemitsu Petrochemical Co., Ltd., Trademark: IDEMITSU POLYPRO F-744 N, MI: 7 g/10 min)

$GPPS_1$: general purpose polystyrene (produced by Idemitsu Petrochemical Co., Ltd., Trademark: IDEMITSU STYROL HH30E, MI: 4 g/10 min)

$GPPS_2$: acid modified polystyrene (produced by Idemitsu Petrochemical Co., Ltd., Trademark: IDEMITSU MOREMAX UG 830, MI: 2 g/10 min)

$HIPS_1$: high impact polystyrene (produced by Idemitsu Petrochemical Co., Ltd., Trademark: IDEMITSU STYROL ET-60, MI: 2 g/10 min)

$HIPS_2$: acid modified polystyrene having impact resistance (produced by Idemitsu Petrochemical Co., Ltd., Trademark: IDEMITSU MOREMAX UH830, MI: 0.7 g/10 min)

SIS: styrene-isoprene elastomer (produced by Shell Chemicals, Trademark: Cariflex TR1107, M: 9 g/10 min)

SBS: styrene-butadiene elastomer (produced by Japan Synthetic Rubber Co., Ltd., Trademark: JSR TR2000, MI: 3 g/10 min)

The production of multilayer composites and containers were carried out as follows.

Multilayer Composite

In each of Examples 1 to 30 and Comparative examples 1 to 16, the resin materials (A), (B), and (C) were extruded simultaneously from an extruder A (screw diameter: 50 mm), an extruder B (screw diameter: 50 mm), and an extruder C (screw diameter: 65 mm), respectively, and a sheet of multilayer composite as shown in FIG. 1 comprising three layers of three kinds was produced by using a feed block and a flat die. The peeling strength between each couple of layers contacting each other was measured. The thickness of each of the layers (A), (B), and (C) was measured. The results are shown in Table 1. The measurement of peeling strength was carried out by using a sample having a width of 15 mm, at a peeling speed of 300 mm/min, with the peeling angle adjusted to 180°.

Container

Each multilayer composite thus obtained was formed into a round-shaped container as shown in FIG. 2 having an opening diameter of 72 mm φ and a draw ratio of 0.3. Each container was provided with a circular notch as a weakening line in the surface layer as shown in FIG. 3. Each container was filled with water and was heat sealed with a resin film of the same resin material as that of the surface layer of the container, with a space of t=1.5 mm left between the inner edge of the sealing area and the weakening line. When the resulting sealed containers were opened by peeling the resin film, every container was peeled between the surface layer and the intermediate layer and exhibited excellent easy openability.

The containers obtained in Examples 14 and 15 endured hot pack well because the acid modified polystyrene used as the resin material of their base layers was excellent in heat resistance. For instance, the container obtained in Example 14 endured hot pack at 95° C., and the container obtained in Example 15 endured not only hot pack at 95° C. but also water sterilization at 95° C. The water sterilization limits of the containers other than that of Example 15 were 80° to 83° C.

In every one of Comparative Examples 1-3 and 5-8 wherein the intermediate layer contained too large an amount of SIS, the adhering strength between the intermediate layer and the polyolefin resin used in the surface layer increased, and easy peelability could not be attained. On the other hand, when the amount of SIS was too small (Comparative Example 4), peeling strength was too small to produce sufficient hermetic sealing for practical use.

Also, the containers obtained in Examples 27, 28, and 30 endured hot pack well because the acid modified polystyrene used as the resin material of their base layers was excellent in heat resistance. For instance, the containers obtained in Example 27 endured hot pack at 95° C., and the containers obtained in Examples 28 and 30 endured not only hot pack at 95° C. but also water sterilization at 95° C. The water sterilization limits of the containers other than those of Examples 28 and 30 were 80° to 83° C.

In every one of Comparative Examples 9, 10, 12, 13, and 16 wherein the intermediate layer contained too large an amount of a polyolefin resin, a thermoplastic elastomer consisting essentially of a styrene-butadiene copolymer, or a mixture of them, the adhering strength between the intermediate layer and the polyolefin resin used in the surface layer increased, and easy peelability could not be attained. On the other hand, when the amount was too small (Comparative Examples 11, 14, and 15), peeling strength was too small to produce sufficient hermetic sealing for practical use.

EXAMPLES 31 and 32

Each of the multilayer composites obtained in Examples 1 and 16 was heated to melted state and was then formed into round-shaped container as shown in FIG. 4 having an opening diameter of 72 mm φ and a draw ratio of 0.5 by means of plug-assist pressure forming. The plug-assist pressure forming was carried out under the conditions shown in Table 3, with a circular part of each multilayer composite to be a fringe was held with a clamp and a former. In each container obtained, the surface layer thereof was thinned at the edge 11 shown in FIG. 4. Each container was filled with water and was heat sealed with a resin film of a linear low density polyethylene. When the resulting sealed containers were opened by peeling the resin film, every container was peeled between the surface layer and the intermediate layer, and finally, the lid (the resin film) and the container body were separated from each other at the edge 11 easily, showing excellent easy openability.

TABLE 1

| No. | Resin material (% by weight) | | | Layers' thickness μm | | | Peeling strength kg/15 mm | | Easy openability |
|---|---|---|---|---|---|---|---|---|---|
| | (A) | (B) | (C) | (A) | (B) | (C) | (A)/(B) | (B)/(C) | |
| Example 1 | $PE_1$ | $GPPS_1$ (80) SIS (20) | $HIPS_1$ | 50 | 50 | 900 | 0.55 | 1.2 | good |
| Example 2 | $PE_1$ | $HIPS_1$ (80) SIS (20) | $HIPS_1$ | 50 | 50 | 900 | 0.55 | 1.3 | good |
| Example 3 | $PE_1$ | $GPPS_1$ (90) SIS (10) | $HIPS_1$ | 50 | 50 | 900 | 0.25 | 1.8 | good |
| Example 4 | $PE_1$ | $GPPS_1$ (75) SIS (25) | $HIPS_1$ | 50 | 50 | 900 | 0.60 | 1.0 | good |
| Example 5 | $PE_1$ | $GPPS_1$ (70) SIS (30) | $HIPS_1$ | 50 | 50 | 900 | 0.70 | 0.9 | good |
| Example 6 | $PE_1$ | $GPPS_1$ (80) SIS (16) SBS (4) | $HIPS_1$ | 50 | 50 | 900 | 0.60 | 1.3 | good |
| Example 7 | $PE_1$ | $GPPS_1$ (80) SIS (16) $PE_2$ (4) | $HIPS_1$ | 50 | 50 | 900 | 0.55 | 1.3 | good |
| Example 8 | $PE_2$ | $GPPS_1$ (80) SIS (20) | $HIPS_1$ | 50 | 50 | 900 | 0.55 | 1.2 | good |
| Example 9 | $PE_3$ | $GPPS_1$ (80) SIS (20) | $HIPS_1$ | 50 | 50 | 900 | 0.50 | 1.2 | good |
| Example 10 | $PE_1$ | $GPPS_1$ (80) SIS (20) | $HIPS_1$ | 5 | 45 | 950 | 0.40 | 1.2 | good |
| Example 11 | $PE_4$ | $GPPS_1$ (80) SIS (20) | $HIPS_1$ | 50 | 50 | 900 | 0.55 | 1.2 | good |
| Example 12 | $PP_2$ | $GPPS_1$ (80) SIS (20) | $HIPS_1$ | 5 | 45 | 950 | 0.30 | 1.2 | good |
| Example 13 | $PP_2$ | $GPPS_1$ (80) SIS (20) | $HIPS_1$ | 50 | 50 | 900 | 0.35 | 1.2 | good |
| Example 14 | $PE_2$ | $GPPS_2$ (80) SIS (20 | $HIPS_1$ | 50 | 50 | 900 | 0.45 | 0.8 | good |
| Example 15 | $PE_2$ | $GPPS_2$ (80) SIS (20) | $HIPS_2$ | 50 | 50 | 900 | 0.45 | 2.0 | good |
| Example 16 | $PE_1$ | $HIPS_1$ (97) SBS (3) | $HIPS_1$ | 50 | 50 | 900 | 0.2 | not peelable | good |
| Example 17 | $PE_1$ | $HIPS_1$ (90) SBS (10) | $HIPS_1$ | 50 | 50 | 900 | 1.2 | not peelable | good |
| Example 18 | $PE_1$ | $HIPS_1$ (85) SBS (15) | $HIPS_1$ | 50 | 50 | 900 | 1.9 | not peelable | good |
| Example 19 | $PE_1$ | $HIPS_1$ (95) $PE_5$ (5) | $HIPS_1$ | 50 | 50 | 900 | 0.5 | not peelable | good |

TABLE 1-continued

| No. | Resin material (% by weight) | | | Layers' thickness μm | | | Peeling strength kg/15 mm | | Easy openability |
|---|---|---|---|---|---|---|---|---|---|
| | (A) | (B) | (C) | (A) | (B) | (C) | (A)/(B) | (B)/(C) | |
| Example 20 | PE₁ | HIPS₁ (85) PE₅ (15) | HIPS₁ | 50 | 50 | 900 | 1.3 | not peelable | good |
| Example 21 | PE₁ | HIPS₁ (75) PE₅ (25) | HIPS₁ | 50 | 50 | 900 | 2.0 | 2.4 | good |
| Example 22 | PE₁ | HIPS₁ (92) PE₅ (4) SBS (4) | HIPS₁ | 50 | 50 | 900 | 1.0 | not peelable | good |
| Example 23 | PE₁ | HIPS₁ (80) PE₅ (16) SBS (4) | HIPS₁ | 50 | 50 | 900 | 1.8 | not peelable | good |
| Example 24 | PE₂ | HIPS₁ (80) PE₅ (16) SBS (4) | HIPS₁ | 50 | 50 | 900 | 1.8 | not peelable | good |
| Example 25 | PE₃ | HIPS₁ (80) PE₂ (16) SBS (4) | HIPS₁ | 50 | 50 | 900 | 1.7 | not peelable | good |
| Example 26 | PE₄ | HIPS₁ (80) PE₅ (16) SBS (4) | HIPS₁ | 50 | 50 | 900 | 1.9 | not peelable | good |
| Example 27 | PP₂ | HIPS₂ (80) PP₁ (16) SBS (4) | HIPS₁ | 50 | 50 | 900 | 1.5 | not peelable | good |
| Example 28 | PE₁ | HIPS₂ (80) PE₅ (16) SBS (4) | HIPS₂ | 5 | 45 | 950 | 1.6 | not peelable | good |
| Example 29 | PE₁ | GPPS₁ (80) PE₅ (16) SBS (4) | HIPS₁ | 50 | 50 | 900 | 1.8 | not peelable | good |
| Example 30 | PE₁ | GPPS₂ (80) EVA (16) SBS (4) | HIPS₂ | 50 | 50 | 900 | 1.7 | 2.5 | good |

TABLE 2

| No. | Resin material (% by weight) | | | Layers' thicknesses μm | | | Peeling strength kg/15 mm | | Easy openability |
|---|---|---|---|---|---|---|---|---|---|
| | (A) | (B) | (C) | (A) | (B) | (C) | (A)/(B) | (B)/(C) | |
| Comparative example 1 | PE₁ | SIS (100) | HIPS₁ | 50 | 50 | 900 | not peelable | 2.5 | not opened |
| Comparative example 2 | PE₁ | GPPS₁ (30) SIS (70) | HIPS₁ | 50 | 50 | 900 | not peelable | 2.0 | not opened |
| Comparative example 3 | PE₁ | GPPS₁ (55) SIS (45) | HIPS₁ | 50 | 50 | 900 | 1.3 | 1.1 | not opened** |
| Comparative example 4 | PE₁ | GPPS₁ (96) SIS (4) | HIPS₁ | 50 | 50 | 900 | 0.1 | not peelable | * |
| Comparative example 5 | PE₂ | GPPS₁ (55) SIS (45) | HIPS₁ | 50 | 50 | 900 | 1.2 | 1.1 | not opened** |
| Comparative example 6 | PE₃ | GPPS₁ (55) SIS (45) | HIPS₁ | 50 | 50 | 900 | 1.2 | 1.1 | not opened** |
| Comparative example 7 | PE₁ | GPPS₁ (55) SIS (45) | HIPS₁ | 5 | 45 | 950 | 1.2 | 1.1 | not opened** |
| Comparative example 8 | PP₂ | GPPS₁ (55) SIS (45) | HIPS₁ | 50 | 50 | 900 | 1.1 | 1.1 | not opened** |
| Comparative example 9 | PE₁ | PE₂ (100) | HIPS₁ | 50 | 50 | 900 | not peelable | 0 | not opened** |
| Comparative example 10 | PE₁ | HIPS₁ (70) PE₂ (30) | HIPS₁ | 50 | 50 | 900 | 3.3 | 1.2 | not opened** |
| Comparative example 11 | PE₁ | HIPS₁ (99) PE₂ (1) | HIPS₁ | 50 | 50 | 900 | 0.1 | not peelable | * |
| Comparative example 12 | PE₁ | HIPS₁ (71) PE₅ (25) SBS (4) | HIPS₁ | 50 | 50 | 900 | 3.0 | 1.3 | not opened** |
| Comparative example 13 | PE₂ | HIPS₂ (66) PE₅ (30) SBS (4) | HIPS₂ | 5 | 45 | 950 | 3.2 | 1.1 | not opened** |
| Comparative example 14 | PE₃ | GPPS₁ (98) PE₅ (1) SBS (1) | HIPS₁ | 50 | 50 | 900 | 0.1 | not peelable | * |
| Comparative example 15 | PE₁ | HIPS₁ (99) SBS (1) | HIPS₁ | 50 | 50 | 900 | 0.1 | not peelable | * |
| Comparative example 16 | PE₁ | HIPS₁ (80) SBS (20) | HIPS₁ | 50 | 50 | 900 | 2.4 | not peelable | * |

*Although the container had easy openability, it was poor in hermetic sealability beacuse of too small peeling strength between the layers (A) and (B).
**Delamination did not occur between the layers (A) and (B) but occured between the layers (B) and (C), and the container could not be opened.

TABLE 3

| No. | Conditions during plug assist pressure forming* | | | | | S ($\mu$m) | T ($\mu$m) | U (kg/cm$^2$) |
|---|---|---|---|---|---|---|---|---|
| | Sheet heating temperature (°C.) | Clamp pressure (kg/cm$^2$) | Sheet extending speed (m/sec) | Mold temperature (°C.) | Drawing ratio | | | |
| Example 31 | 145 | 5 | 3 | 30 | 0.5 | 50 | 8 | 290 |
| Example 32 | 145 | 5 | 3 | 30 | 0.5 | 50 | 8 | 290 |

*A container thermoforming machine fabricated by United Mold Co., Ltd., CM-6333 type, was used.

What is claimed is:
1. A multilayer composite, comprising:
   (A) a surface layer of a polyolefin resin;
   (B) an intermediate layer of a mixture of a polystyrenic resin and a polymer other than the polystyrenic resin, the polymer consisting essentially of
      (a) 5 to 40% by weight of a thermoplastic elastomer consisting essentially of a styrene-isoprene copolymer, based on the total of the polystyrenic resin and the polymer in the intermediate layer or
      (b) (i) 0 to 15% by weight of a thermoplastic elastomer consisting essentially of a styrene-butadiene copolymer and (ii) 0 to 25% by weight of a polyolefin resin, with the proviso that the total of the thermoplastic elastomer and the polyolefin resin is 3 to 25% by weight, all based on the total of the polystyrenic resin and the polymer in the intermediate layer; and
   (C) a base layer of a polystyrenic resin, the base layer and the surface layer sandwiching the intermediate layer therebetween;
   wherein the peeling strength between the base layer and the intermediate layer is larger than the peeling strength between the surface layer and the intermediate layer.

2. The multilayer composite of claim 1, wherein the polymer in the intermediate layer consists essentially of 5 to 40% by weight of a thermoplastic elastomer consisting essentially of styrene-isoprene copolymer, based on the total of the polystyrenic resin and the polymer in the intermediate layer.

3. The multilayer composite of claim 2, wherein the peeling strength between the surface layer and the intermediate layer is 0.2 to 1.5 kg/15 mm as measured at a peeling speed of 300 mm/min, and the peeling strength between the intermediate layer and the base layer is at least 1.1 times as much as the peeling strength between the surface layer and the intermediate layer.

4. The multilayer composite of claim 3, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

5. The multilayer composite of claim 1, wherein the polymer in the intermediate layer consists essentially of (i) 0 to 15% by weight of a thermoplastic elastomer consisting essentially of a styrene-butadiene copolymer and (ii) 0 to 25% by weight of a polyolefin resin, the total of the thermoplastic elastomer and the polyolefin resin being 3 to 25% by weight, all based on the total of the polystyrenic resin and the polymer in the intermediate layer.

6. The multilayer composite of claim 5, wherein the peeling strength between the surface layer and the intermediate layer is 0.2 to 2.0 kg/15 mm as measured at a peeling speed of 300 mm/min, and the peeling strength between the intermediate layer and the base layer is at least 1.1 times as much as the peeling strength between the surface layer and the intermediate layer.

7. The multilayer composite of claim 6, wherein the polymer in the intermediate layer consists essentially of 3 to 15% by weight of a thermoplastic elastomer consisting essentially of a styrene-butadiene copolymer, based on the total of the polystyrenic resin and the polymer in the intermediate layer.

8. The multilayer composite of claim 7, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

9. The multilayer composite of claim 6, wherein the polymer in the intermediate layer consists essentially of 3 to 25% by weight of a polyolefin resin, based on the total of the polystyrenic resin and the polymer in the intermediate layer.

10. The multilayer composite of claim 9, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

11. The multilayer composite of claim 6, wherein the polymer in the intermediate layer consists essentially of at most 15% by weight of a thermoplastic elastomer consisting essentially of styrene-butadiene copolymer and at most 25% by weight of a polyolefin resin, the total of the thermoplastic elastomer and the polyolefin resin being 3 to 25% by weight, all based on the total of the polystyrenic resin and the polymer in the intermediate layer.

12. The multilayer composite of claim 11, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof, and the polyolefin resin in the intermediate layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

13. The multilayer composite of claim 1, wherein the polystyrenic resin is a general purpose polystyrene, a high impact polystyrene, an acid modified polystyrene, a syndiotactic polystyrene or a mixture thereof.

14. The multilayer composite of claim 1, wherein the polymer other than the polystyrenic resin consists essentially of (b) (i) 0 to 15% by weight of a thermoplastic elastomer consisting essentially of a styrene-butadiene copolymer and (b) (ii) 0 to 25% by weight of a polyolefin resin, with the further proviso that when the content of the polyolefin resin (ii) is 0% by weight, the intermediate layer (B) contains the thermoplastic elastomer consisting essentially of the styrene-butadiene copolymer in an amount of 3 to 15% by weight and when the content of the thermoplastic elastomer (i) is 0% by weight, the intermediate layer (B) contains the polyolefin resin in an amount of 3 to 25% by weight.

15. A multilayer sheet, comprising:
   (A) a surface layer of a polyolefin resin;
   (B) an intermediate layer of a mixture of a polystyrenic resin and a polymer other than the polystyrenic resin, the polymer consisting essentially of
      (a) 5 to 40% by weight of a thermoplastic elastomer consisting essentially of a styrene-isoprene copolymer, based on the total of the polystyrenic resin and the polymer in the intermediate layer or
      (b) (i) 0 to 15% by weight of a thermoplastic elastomer consisting essentially of a styrene-butadiene copolymer and (ii) 0 to 25% by weight of a polyolefin resin, with the proviso that the total of the thermoplastic elastomer and the polyolefin resin 3 to 25% by weight, all based on the total of the polystyrenic resin and the polymer in the intermediate layer; and
   (C) a base layer of a polystyrenic resin, the base layer and the surface layer sandwiching the intermediate layer therebetween;
wherein the peeling strength between the base layer and the intermediate layer is larger than the peeling strength between the surface layer and the intermediate layer.

16. The multilayer sheet of claim 15, wherein the polymer in the intermediate layer consists essentially of 5 to 40% by weight of a thermoplastic elastomer consisting essentially of styrene-isoprene copolymer, based on the total of the polystyrenic resin and the polymer in the intermediate layer.

17. The multilayer sheet of claim 16, wherein the peeling strength between the surface layer and the intermediate layer is 0.2 to 1.5 kg/15 mm as measured at a peeling speed of 300 mm/min, and the peeling strength between the intermediate layer and the base layer is at least 1.1 times as much as the peeling strength between the surface layer and the intermediate layer.

18. The multilayer sheet of claim 17, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof 19. The multilayer sheet of claim 15, wherein the polymer in the intermediate layer consists essentially of (i) 0 to 15% by weight of a thermoplastic elastomer consisting essentially of a styrene-butadiene copolymer and (ii) 0 to 25% by weight of a polyolefin resin, the total of the thermoplastic elastomer and the polyolefin resin being 3 to 25% by weight, all based on the total of the polystyrenic resin and the polymer ingredient in the intermediate layer.

20. The multilayer sheet of claim 19, wherein the peeling strength between the surface layer and the intermediate layer is 0.2 to 2.0 kg/15 mm as measured at a peeling speed of 300 mm/min, and the peeling strength between the intermediate layer and the base layer is at least 1.1 times as much as the peeling strength between the surface layer and the intermediate layer.

21. The multilayer sheet of claim 20, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof, and the polyolefin resin in the intermediate layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

22. The multilayer sheet of claim 15, wherein the polystyrenic resin is a general purpose polystyrene, a high impact polystyrene, an acid modified polystyrene, a syndiotactic polystyrene or a mixture thereof.

23. The multilayer sheet of claim 15, wherein the polymer other than the polystyrenic resin consists essentially of (b) (i) 0 to 15% by weight of a thermoplastic elastomer consisting essentially of a styrene-butadiene copolymer and (b) (ii) 0 to 25% by weight of a polyolefin resin, with the further proviso that when the content of the polyolefin resin (ii) is 0% by weight, the intermediate layer (B) contains the thermoplastic elastomer consisting essentially of the styrene-butadiene copolymer in an amount of 3 to 15% by weight and when the content of the thermoplastic elastomer (i) is 0% by weight, the intermediate layer (B) contains the polyolefin resin in an amount of 3 to 25% by weight.

24. An easily openable container, comprising:
   (A) a surface layer of a polyolefin resin for forming an easily peelable layer;
   (B) an intermediate layer for regulating peelable strength comprised of a mixture of a polystyrenic resin, the polymer consisting essentially of
      (a) 5 to 40% by weight of a thermoplastic elastomer consisting essentially of a styrene-isoprene copolymer, based on the total of the polystyrenic resin and the polymer in the intermediate layer or
      (b) (i) 0 to 15% by weight of a thermoplastic elastomer consisting essentially of a styrene-butadiene copolymer and (ii) 0 to 25% by weight of a polyolefin resin with the proviso that the total of the thermoplastic elastomer and the polyolefin resin 3 to 25% by weight, all based on the total of the polystyrenic resin and the polymer in the intermediate layer; and
   (C) a base layer of a polystyrenic resin, the base layer and the surface layer sandwiching the intermediate layer therebetween;
wherein the peeling strength between the base layer and the intermediate layer is larger than the peeling strength between the surface layer and the intermediate layer;
   (II) a bottom wall;
   (III) a side wall upstanding from the bottom wall; and
   (IV) a fringe surrounding the open end of the side wall and extending outwardly therefrom, the fringe having on its upper surface a circular sealing area extending circularly thereon, the sealing area being adapted to seal the easily openable container with a lid by heat sealing the lid circularly to the easily openable container at the sealing area.

25. The easily openable container of claim 24, wherein the polymer in the intermediate layer consists essentially of 5 to 40% by weight of a thermoplastic elastomer consisting essentially of styrene-isoprene copolymer, based on the total of the polystyrenic resin and the polymer in the intermediate layer.

26. The easily openable container of claim 25, wherein the peeling strength between the surface layer and the intermediate layer is 0.2 to 1.5 kg/15 mm as measured at a peeling speed of 300 mm/min, and the peeling strength between the intermediate layer and the base layer is at least 1.1 times as much as the peeling strength between the surface layer and the intermediate layer.

27. The easily openable container of claim 26, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

28. The easily openable container of claim 24, wherein the polymer in the intermediate layer consists essentially of (i) 0 to 15% by weight of a thermoplastic elastomer consisting essentially of a styrene-butadiene copolymer and (ii) 0 to 25% by weight of a polyolefin resin, the total of the thermoplastic elastomer and the polyolefin resin being 3 to 25% by weight, all based on the total of the polystyrenic resin and the polymer in the intermediate layer.

29. The easily openable container of claim 28, wherein the peeling strength between the surface layer and the intermediate layer is 0.2 to 2.0 kg/15 mm as measured at a peeling speed of 300 mm/min, and the peeling strength between the intermediate layer and the base layer is at least 1.1 times as much as the peeling strength between the surface layer and the intermediate layer.

30. The easily openable container of claim 29, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof, and the polyolefin resin in the intermediate layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

31. The easily openable container of claim 24, wherein a circular weakening line is provided in the surface layer of the fringe between the open end of the side wall and the inner edge of the circular sealing area.

32. The easily openable container of claim 31, wherein the polymer in the intermediate layer consists essentially of 5 to 40% by weight of a thermoplastic elastomer consisting essentially of styrene-isoprene copolymer, based on the total of the polystyrenic resin and the polymer in the intermediate layer.

33. The easily openable container of claim 32, wherein the peeling strength between the surface layer and the intermediate layer is 0.2 to 1.5 kg/15 mm as measured at a peeling speed of 300 mm/min, and the peeling strength between the intermediate layer and the base layer is at least 1.1 times as much as the peeling strength between the surface layer and the intermediate layer.

34. The easily openable container of claim 33, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

35. The easily openable container of claim 31, wherein the polymer in the intermediate layer consists essentially of (i) 0 to 15% by weight of a thermoplastic elastomer consisting essentially of a styrene-butadiene copolymer and (ii) 0 to 25% by weight of a polyolefin resin, the total of the thermoplastic elastomer and the polyolefin resin being 3 to 25% by weight, all based on the total of the polystyrenic resin and the polymer in the intermediate layer.

36. The easily openable container of claim 35, wherein the peeling strength between the surface layer and the intermediate layer is 0.2 to 2.0 kg/15 mm as measured at a peeling speed of 300 mm/min, and the peeling strength between the intermediate layer and the base layer is at least 1.1 times as much as the peeling strength between the surface layer and the intermediate layer.

37. The easily openable container of claim 36, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof, and the polyolefin resin in the intermediate layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

38. The easily openable container of claim 24, wherein the surface layer has a thickness of S μm in the sealing area in the fringe, has a thickness of T μm at the edge between the fringe and the side wall, and is made of a material having a tensile breaking strength of U kg/cm², the numerical values of S, T, and U being so related to each other through the following inequalities or equations $$S \geq 1.1 \times T$$

$$T \leq (1.33/U) \times 10^4,$$

and the tensile load per unit width required to break the surface layer at the edge between the fringe and the side wall is smaller than the load per unit width required to peel the surface layer from the intermediate layer at the edge between the fringe and the side wall.

39. The easily openable container of claim 38, wherein the polymer in the intermediate layer consists essentially of 5 to 40% by weight of a thermoplastic elastomer consisting essentially of styrene-isoprene copolymer, based on the total of the polystyrenic resin and the polymer ingredient in the intermediate layer.

40. The easily openable container of claim 39, wherein the peeling strength between the surface layer and the intermediate layer is 0.2 to 1.5 kg/15 mm as measured at a peeling speed of 300 mm/min, and the peeling strength between the intermediate layer and the base layer is at least 1.1 times as much as the peeling strength between the surface layer and the intermediate layer.

41. The easily openable container of claim 40, wherein the polyolefin resin in the surface layer is an ethylene homopolymer, an ethylene-vinyl acetate copolymer, an ethylene-α-olefin copolymer, an ethylene-β-olefin copolymer, a propylene homopolymer, a propylene-olefin copolymer, or a mixture thereof.

42. The easily openable container of claim 38, wherein the polymer in the intermediate layer consists essentially of (i) 0 to 25% by weight of thermoplastic elastomer consisting essentially of a styrene-butadiene copolymer and (ii) 0 to 25% by weight of a polyolefin resin, the total of the thermoplastic elastomer and the polyolefin resin being 3 to 25% by weight, all based on the total of the polystyrenic resin and the polymer in the intermediate layer.

43. The easily openable container of claim 42, wherein the peeling strength between the surface layer and the intermediate layer is 0.2 to 2.0 kg/15 mm as measured at a peeling speed of 300 mm/min, and the peeling strength between the intermediate layer and the base layer is at least 1.1 times as much as the peeling strength between the surface layer and the intermediate layer.

44. The easily openable container of claim 43, wherein the polyolefin resin in the surface layer is an ethylene homopolymer, an ethylene-vinyl acetate copolymer, an ethylene-$\alpha$-olefin copolymer, an ethylene-$\beta$-olefin copolymer, a propylene homopolymer, a propylene-olefin copolymer, or a mixture thereof, and the polyolefin resin in the intermediate layer is an ethylene homopolymer, an ethylene-vinyl acetate copolymer, an ethylene-$\alpha$-olefin copolymer, an ethylene-$\beta$-olefin copolymer, a propylene homopolymer, a propylene-olefin copolymer, or a mixture thereof.

45. The easily openable container of claim 24, wherein the polystyrenic resin is a general purpose polystyrene, a high impact polystyrene, an acid modified polystyrene, a syndiotactic polystyrene or a mixture thereof.

46. The easily openable container of claim 24, wherein the polymer other than the polystyrenic resin consists essentially of (b)(i) 0 to 15% by weight of a thermoplastic elastomer consisting essentially of a styrene-butadiene copolymer and (b)(ii) 0 to 25% by weight of a polyolefin resin, with the further proviso that when the content of the polyolefin resin (ii) is 0% by weight, the intermediate layer (B) contains the thermoplastic elastomer consisting essentially of the styrene-butadiene copolymer in an amount of 3 to 15% by weight and when the content of the thermoplastic elastomer (i) is 0% by weight, the intermediate layer (B) contains the polyolefin resin in an amount of 3 to 25% by weight.

* * * * *